United States Patent [19]
Benson

[11] 3,829,043
[45] Aug. 13, 1974

[54] HOVERCRAFT SECONDARY LIFT SYSTEM

[76] Inventor: William Benson, P.O. Box 5194, San Bernardino, Calif. 92404

[22] Filed: Dec. 13, 1971

[21] Appl. No.: 207,380

[52] U.S. Cl............................................. 244/12 R
[51] Int. Cl........................................... B64c 29/00
[58] Field of Search.......... 244/2, 12 R, 12 C, 23 R, 244/23 C, 7 R, 7 A, 35, 40; 180/117, 118, 116, 120, 122, 1 P, 7 P

[56] References Cited
UNITED STATES PATENTS

| | | | |
|---|---|---|---|
| 2,461,435 | 2/1949 | Neumann et al. | 244/23 C |
| 3,034,747 | 5/1962 | Lent | 244/23 C |
| 3,362,495 | 1/1968 | Lacey | 180/117 |
| 3,412,956 | 11/1968 | Cockerell | 244/2 |
| 3,465,988 | 9/1969 | Orr | 244/35 R X |
| 3,489,374 | 1/1970 | Morcom | 244/12 C |

*Primary Examiner*—Duane A. Reger
*Assistant Examiner*—Jesus D. Sotela
*Attorney, Agent, or Firm*—Stephen J. Koundakjian, Esq.

[57] ABSTRACT

A secondary lift system for an air cushion supported vehicle of the type having a chamber through which a flow of air is maintained. Air foil surfaces are positioned within the chamber. The flow of air around the air foil surfaces provides secondary lift for the vehicle. The resulting lift from the air foil surfaces is utilized to elevate the vehicle and to control the inclination of the vehicle.

7 Claims, 3 Drawing Figures

PATENTED AUG 13 1974　　　　　　　　　　　　3,829,043

INVENTOR
WILLIAM BENSON
BY
Finkelstein & Mueth
ATTORNEYS

3,829,043

HOVERCRAFT SECONDARY LIFT SYSTEM

BACKGROUND OF THE INVENTION

1. Field of the Invention

The present invention generally relates to air cushion vehicles and more particularly, to a secondary lift system for a HOVERCRAFT.

2. Description of the Prior Art

Ground effect vehicles, commonly known as HOVERCRAFT, are supported out of contact with the surface over which the craft travels or hovers by a cushion of pressurized fluid contained beneath the craft. Since the fluid medium is normally air, the vehicles are also commonly referred to as air cushion vehicles. A HOVERCRAFT generally comprises a body or hull in which a rotor or other air moving device is mounted to produce an air cushion on which the craft is supported. Since there is no contact between the craft and the surface there is no friction to overcome.

The HOVERCRAFT operates on what is known as the ground effect to form the air cushion. The ground effect results from the annular pattern associated with the flow of air at a right angle into a surface. All the flow and turbulence is concentrated at the edges while at the center an air cushion is formed in which the air is very nearly at rest. At the edge of the cushion the concentrated flow and turbulence constitutes an annular jet of air that forms a curtain which insulates the cushion from the surrounding lower pressure atmospheric air.

This system of support is also applicable to the mobile platforms and the term craft or vehicle as used herein includes mobile platforms.

As the load increases on a HOVERCRAFT the air cushion is compressed and clearance between the hull of the craft and the surface decreases. This limits the craft's ability to negotiate obstacles on the surface or surface grades. The prior art systems provide for increasing the lift by means of increasing the power to the air moving rotor.

In order to vary the inclination of the HOVERCRAFT with respect to the surface so as to compensate for uneven loads or to maneuver the craft, deflecting devices are sometimes positioned in the path of the air flow to deflect some fo the air back up against the hull of the craft to provide lift where the air strikes the hull. In this system, an equal downward force is produced on the deflector elements so that the end result is a torquing force applied to the craft. This torquing force varies the inclination of the craft but provides no overall lift.

OBJECTS OF THE INVENTION

It is an object of the invention to provide a secondary lift system for a HOVERCRAFT for increasing the lifting ability of the craft.

Another object of the invention is to provide a system for varying the inclination of a HOVERCRAFT to compensate for various land profiles.

A further object of the invention is to provide a system for varying the inclination of the craft for maneuvering and control.

A still further object of the invention is to provide a system for increasing the clearance of the HOVERCRAFT without increasing the power to the air moving rotor.

These and other of the invention are achieved by providing one or more air foil surfaces in the path of the cushion generating air flow and connected to the craft. The air flow around the air foil surfaces results in generating lift that is imparted to the craft. Variation in thepitch or angle of attack of the air flow surfaces permits control of the inclination of the craft.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
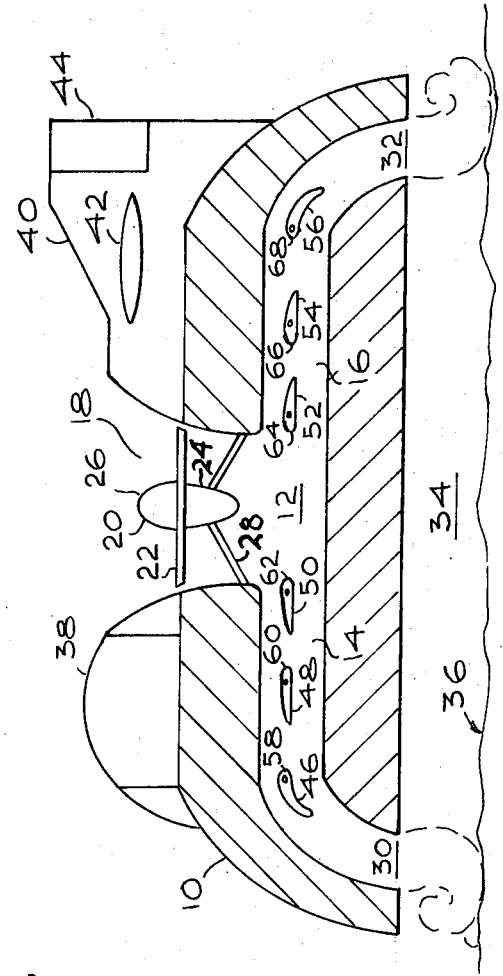
FIG. 1 is a partial cross sectional side view of a preferred embodiment of the invention.

The HOVERCRAFT illustrated in FIG. 1, comprises a main body or hull 10 having an annular chamber 12 including air flow channels 14 and 16. Air is drawn in from air intake 18 and forced through chamber 12 by a mass flow device 20 comprising a compressor or fan. While this embodiment is described with a compressor or fan moving the air, the invention is not limited to such units. Any type of fluid moving device including turbines or jet engines may be utilized. Mas flow device 20 comprises propeller blades 22 driven by a motor contained in rear cone 24. Forward cone 26 shapes the air taken into annular chamber 12 through air intake 18. Struts 28 support compressor or fan 20 and may also act as stator vanes for straightening the air flow.

The air is discharged through flow exits 30 and 32. The discharged air forms a curtain comprised of annular jets of air. This curtain contains the cushion of air 34 between the hull 10 and the ground surface 36. The ground surface can be any surface and include fluid surfaces such as water surfaces. This curtain of air fomed from air flow exits 30 and 32 insulates the cushion of air 34 from the surrounding lower-pressure atmospheric air.

A cabin 38 is placed above forward flow channel 14 and carries passengers or cargo. The controls for operating the craft are also located here.

Vertical section 40 is placed above rear flow channel 16. This section contains vertical stabilizer 44 and horizontal stabilizer 42. Vertical stabilizer 44 acts like an air foil surface while horizontal stabilizer 42 acts like a rudder.

Positioned within annular chamber 12 and inside flow chambers 14 and 18 are air foils 46, 48, 50, 52, 54 and 56. Air foils 46, 48, 50, 52, 54 and 56 are connected to the walls of flow chambers 14 and 18 and thus to hull 10. In addition, they are adapted to be able to rotate about pivotal elements 58, 60, 62, 64, 66 and 68, respectively, under control from cabin 28.

Figure 2:
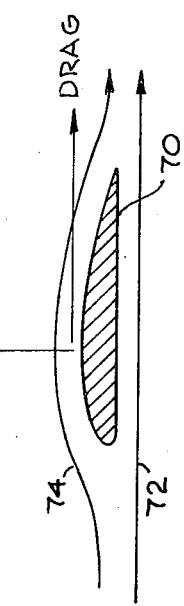
FIG. 2 is a side view of an air foil section.

FIG. 2 illustrates the cross section of air foil 52 which is typical of the cross section of air foils 46, 48, 50, 52, 54 and 56. While a typical air foil cross section has been described the invention is not limited to any particular air foil or air foil cross section.

When the air flows over air foil 70, the flow of air 72 along the lower surface arrives at the trailing edge before the flow 74 along the upper surface. The lower surface flow attempts to expand around the trailing edge. As a result of this a vortex is formed. The rotation of this vortex accelerates the upper surface flow, so that the length of time requird for a particle of air to move from the leading edge to the trailing edge becomes the same for the upper and the lower surface flow. The increased velocity of the upper surface flow eliminates the formation of a vortex by the lower surface air at the trailing edge, and it produces a lower pressure at each point on the upper surface than exists at the corresponding points on the lower surface. It is this difference in pressure that produces lift. The distribution of lift along he cross section of an air foil is well known. The lift force is directed at right angles to the directions of movement of the air. In addition, frictional resistance produces a frag force in the direction of movement of the air.

Returning now to FIG. 1, the air flow through flow channels 14 and 16 flows around air foils 46, 48, 50, 52, 54 and 56, producing lift forces that are coupled to the hull 10. The resulting lift forced relieve the power requirements for the mass flow device. This is due to the increase in lifting ability for a given power level.

By adjusting the angle of attack of the air foils, the inclination of the craft can be varied. For example, the angle of attack of air foils 46, 48 and 50 can be increased to provide additional lift to the front section. This can compensate for a heavier load in the front section or for variations in inclination due to the speed of the craft. Thus, the present invention not only provides secondary lift but also provides means for controlling the inclination of the craft relative to the ground surface.

While the invention has been particularly described with respect to a HOVERCRAFT emplying an annular chamber and operating in air, the invention is not limited to such systems. The invention is applicable to any ground effect device operating in any fluid medium including HOVERCRAFT employing plenum chambes.

Figure 3:
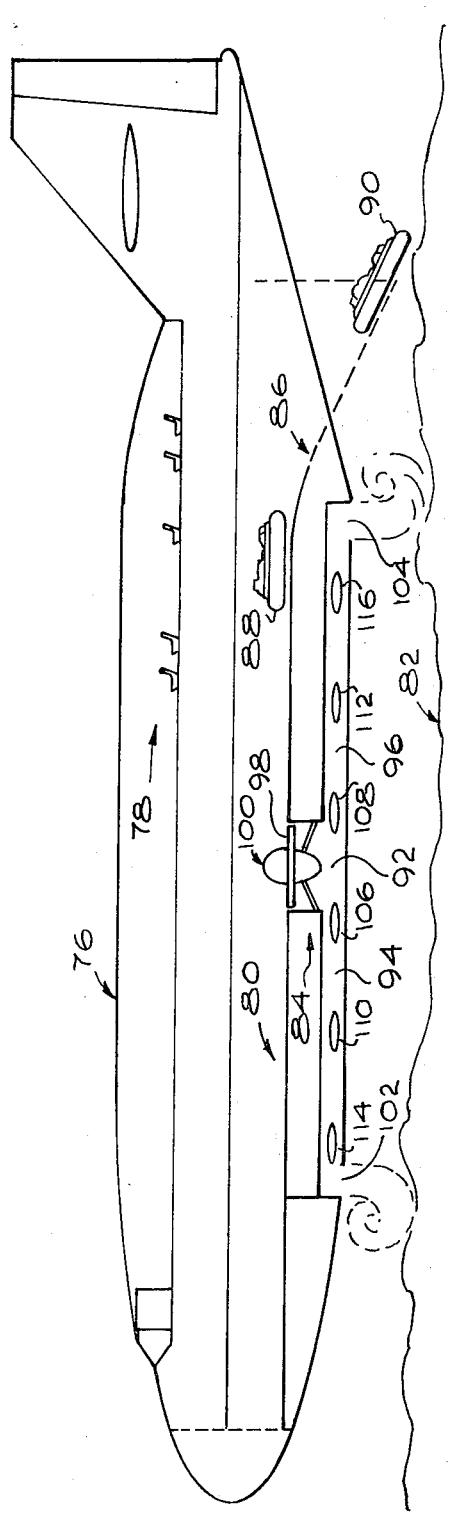
FIG. 3 is a partial cross sectional side view of an embodiment of the invention involving a conventional aircraft.

FIG. 3 illustrates a conventional transport aircraft 76 including a passenger deck 78 and cargo deck 80. The invention can be employed in conjuction with such aircraft in order to provide supplemental lift to facilitate the unloading of cargo or passengers over a surface 82 that will not support the aircraft or permit takeoff and landing. Such surfaces are marshes, water, mud, and rough terrain.

A HOVERCRAFT 84 can be incorporated into the body of the aircraft 76 to provide lift for the aircraft anpermit it to hover over the ground surface at low speeds. When hovering the aircraft can lower ramp 86 and discharge passengers and cargo which may include HOVERCRAFT vehicles 88 and 90.

HOVERCRAFT 84 incudes annular chamber 92 and air flow channels 94 and 96. Air is drqwn in from air intake 98 and forced through chamber 12 by mass flow device 100. The air is discharged through flow exits 102 and 104. This flow of air creates the curtain and cushion associated with the HOVERCRAFT system and previously described in conjuction with FIG. 1.

Positioned within annular chambers 94 and 96 are air foils 106, 108, 110, 112, 114 and 116. In accordance with the teachings of the invention, the air flow through flow channels 94 and 96 flows around air foils 106, 108, 110, 112, 114 and 116 producing lift forces that supplement the lift provided by HOVERCRAFT 80. In this way, the present invention can be utilized to enhance the lift of a conventional aircraft at very low speeds and permit the loading or unloading of cargo or passengers, over normally inaccessible surfaces.

Although particular embodiments of he invention have been described and illustrated herein, it is recognized that modifications and variations may readily occur to those skilled in the art and consequently it is intended that the claims be interpreted to cover such modifications and equivalents.

I claim:

1. A secondary lift system for a ground effect device having a chamber with at least one wall through which a flow of fluid is maintained, comprising:
    at least one air foil positioned within the chamber and coupled to the wall to produce lift forces from the air flow over the air foil;
    a pivotal element coupling the air foil to the wall; and
    control means coupled to the air foil to vary the aerodynamic forces on the air foil and thus the secondary lift provided to the ground effect device.

2. A secondary lift system as defined in claim 1 wherein:
    the chamber includes two or more flow channels; and
    at least one air foil is positioned within each flow channel.

3. An improved air cushion supported vehicle of the type wherein a mass air flow device forces air through a chamber with at least one wall forming a curtain of air that serves to contain a cushion of air between the wall of the vehicle and the ground surface, wherein the improvement comprises:
    at least one air foil positioned within the chamber and coupled to the wall to produce secondary lift forces from the air flow over the air foil;
    a pivotal element coupling the air foil to the all; and
    control means coupled to the air foil to adjust the angle of attack of the air foil to vary the aerodynamic forces on the air foil and thus the secondary lift forces provided to the vehicle.

4. An improved air cushion supported vehicle are defined in claim 3 wherein the chamber comprises a plenum chamber.

5. An improved air cushion supported vehicle as defined in claim 3 wherein the chamer comprises an annular chamber.

6. An improved air cushion supported vehicle as defined in claim 5 wherein:
    the annular chamber includes two or more flow channels; and
    at least one air foil is positioned within each flow channel.

7. A device for providing supplemental lift to an aircraft under ground-effect conditions, comprising:
    a chamber force-transmissively associated with the structure of the aircraft, said chamer substantially fully enclosed except for a primary orifice and at least two secondary orifices, said primary orifice and said secondary orifices providing communication between the interior of said chamber and the ambient, said secondary orifices oriented in a downward, substantially vertical direction with respect to the ventral surface of the aircraft;

air flow means, wholly independent of the means for providing primary lift and propulsion of the aircraft, to cause a flow of air from the ambient through said primary orifice, into said chamber and out of said secondary orifices into the ambient; and at least one air foil surface within said chamber force-transmissively coupled thereto and operatively oriented with respect to the flow of air through said chamber so as to produce secondary lift forces on the aircraft, said air foil wholly independent of the primary lift and propulsive means for sustained flight of the aircraft.

* * * * *